Jan. 20, 1931.  H. A. SNOW  1,789,912
TUNING DEVICE
Filed Oct. 17, 1924
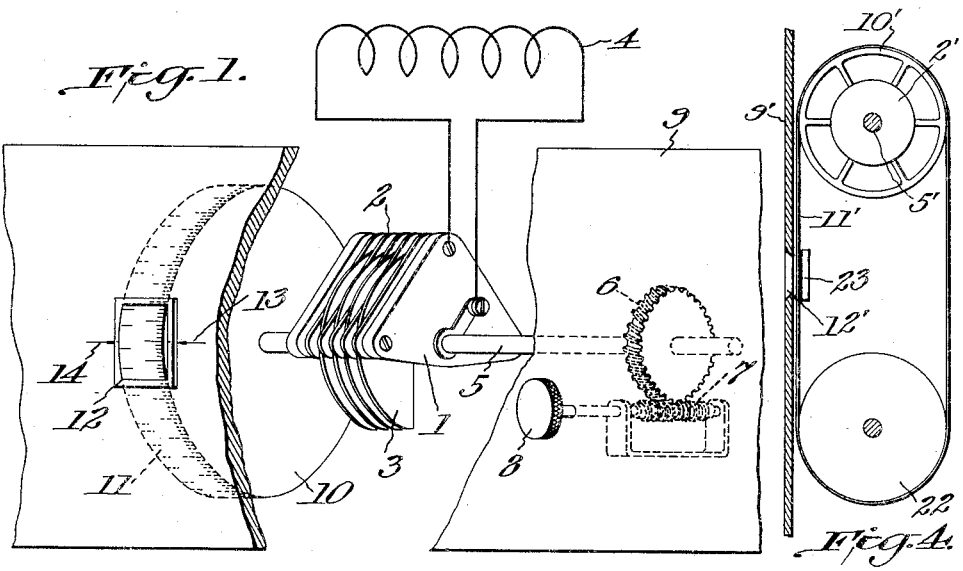
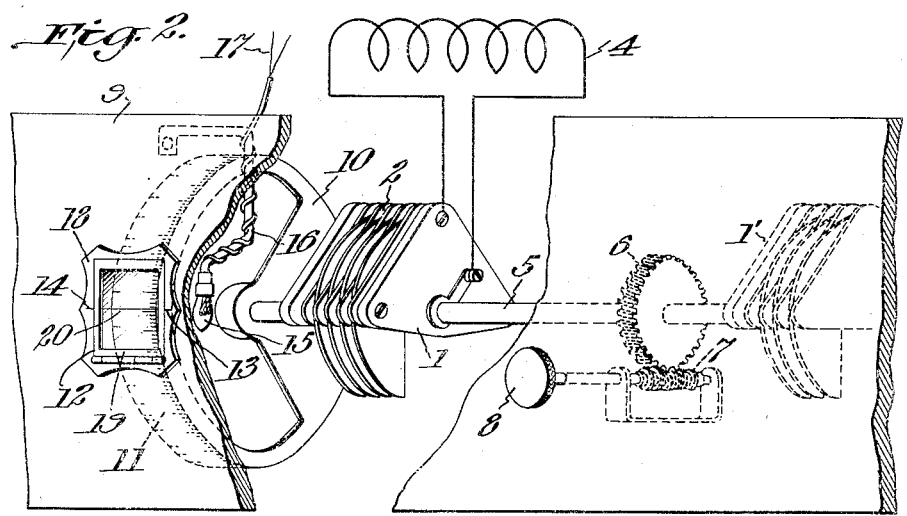
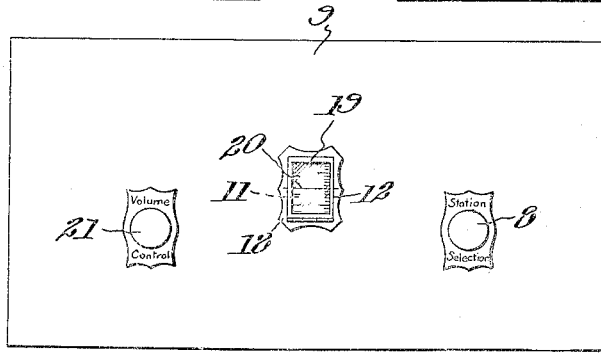
Inventor:
Harold A. Snow Patented Jan. 20, 1931

1,789,912

UNITED STATES PATENT OFFICE

HAROLD A. SNOW, OF BOONTON, NEW JERSEY, ASSIGNOR TO RADIO FREQUENCY LABORATORIES, INCORPORATED, OF BOONTON, NEW JERSEY, A CORPORATION OF NEW JERSEY

TUNING DEVICE

Application filed October 17, 1924. Serial No. 744,095.

This invention relates to tuning devices for electrical circuits and is particularly applicable to radio apparatus.

It is common practice, where resonant electrical circuits are mounted back of a panel, to provide controls for the variable elements of such circuits which protrude through to the face of the panel and which carry either a movable pointer which passes over a fixed scale or a movable scale which is caused to rotate past a fixed fiducial mark by the motion of the control. In general, the combination of the control with its associated scale, the circuit elements, the electrical reactance of which is varied by the motion of the control, and the other fixed circuit elements, constitute a resonance system which may be calibrated in resonant wave lengths, and thereafter adjusted to any predetermined wave length by observation of the scale. I have found, however, that the conventional arrangements on a panel comprising either a dial in a plane parallel to said panel or a scale fixed on said panel with movable pointer are ill adapted for accurate calibration and for the easy inscription of observed resonance points by an operator.

An object of the invention is to provide a tuning device in which an electrical circuit may be set with a high degree of accuracy at resonance with currents of a predetermined wave length. A further object of the invention is to provide a tuning device including an indicating device upon which figures or the like may be inscribed by the operator to indicate the condition of resonance of the circuit. More specifically an object of the invention is to provide a tuning device including a variable reactor having a rotor element, and in which the shaft of the rotor element carries an indicating drum which is so positioned that a portion of the peripheral surface of the drum is visible through an opening in the opaque panel behind which the elements of the tuning device are located.

Embodiments of my invention are illustrated in the accompanying drawings, in which, Fig. 1 is a broken view, in perspective, of the novel elements of the tuning device;

Fig. 2 is a similar perspective view of a modification in which the scale is illuminated from the rear of the panel;

Fig. 3 is a front elevation of the panel of a radio receiver provided with the novel tuning device; and Fig. 4 is an end elevation, in section, of a modified arrangement of the indicating scale.

In the drawings, the numeral 1 indicates a variable air condenser comprising a stator 2 and rotor 3, across which the inductance coil 4 is shunted in the usual manner. The movable plates or rotor 3 are carried by a shaft 5 which may be rotated by the gear 6, worm 7 and knob 8 to produce a continuous variation in the capacity of the condenser 1 for adjusting the condition of resonance of the tuned circuit 1—4. As illustrated, the shaft 5 is parallel to the opaque panel 9 through which the knob 8 projects, and the shaft carries an indicating drum 10 which has the form of a right circular cylinder coaxial with the shaft 5. The smooth periphery of the drum is incribed with a scale 11 which may be marked in a predetermined manner by the manufacturer, or according to observed settings by the operator. Preferably the length of the indicating cylinder is such that a predetermined scale may be inscribed at one edge of the drum and observed settings may be marked at the opposite edge. The drum 10 is so positioned that it is substantially tangent to the panel surface and a section of the scale surface projects into or is visible through an aperture 12 in the opaque panel 9. Fiducial marks 13, 14 are engraved on or rigidly attached to the panel closely adjacent the visible portion of the scale surface.

As applied to a radio receiver, the condenser 1 and coil 4 form the tuning unit and the scale 11 is calibrated directly in wave length or frequencies. The surface 10 of the drum preferably comprises a dull white material, as celluloid, adapted to take pen or pencil marks, thereby permitting the operator to make notations of the call letters or other identifying characteristics of transmitting stations which are received at particular settings of the movable system.

Another embodiment of the invention is illustrated in Fig. 2, in which view the numerals 1 to 14 inclusive identify parts equivalent to those shown in Fig. 1. In this second embodiment the drum 10 is hollow and a portion of one side wall is cut away along an arc of more than 180 degrees to permit the positioning of a light source 15 behind the panel aperture. The light 15 is supported by a bracket 16 on the panel 9 and is supplied with current through conductors 17 which may be conveniently attached to the audion filament battery of the receiver. The scale surface of the indicating drum is formed of translucent material, as celluloid, and is illuminated by the light transmitted therethrough.

The panel fiducial lines 13, 14 are engraved or marked upon a plate 18 which surrounds the panel aperture, and to which a window 19 is hinged at its lower edge. The transparent window is provided with a fiducial mark 20 which aligns with the mark 13, 14 of the plate.

The invention may be used to advantage with a plurality of variable tuning reactors, all adjusted to resonance by the rotary motion of a common shaft. As illustrated in Fig. 2, the shaft 5 may carry the rotary plates of a second condenser 1', which forms part of a second tuning unit of appropriate design.

A panel arrangement characteristic of radio receivers embodying the invention is illustrated in Fig. 3. The panel 9 is provided with the window 19 through which the scale drum is visible. The knob 8 projects from the panel for adjusting the shaft which carries the scale and the movable elements of one or more variable reactors. A second knob 21 may be provided for controlling regeneration in any desired manner. Suitable plates carrying appropriate legends, as "Station selection" and "Volume control" may be provided in connection with the control knobs 8 and 21, respectively.

While the embodiments illustrated employ a variable tuning capacity, is is obvious that the invention is equally applicable to devices in which a variable inductance or other reactive element forms part of a tuned circuit in which the reactance, and hence the resonance, condition of the circuit is varied by a rotary motion of one portion of the variable reactor.

It is not essential that the scale be scribed upon the surface of the drum 10 and with some arrangements an indicating device or scale in the form of a belt or ribbon is preferable. As shown in Fig. 4, the operating shaft 5' of a variable reactor 2' carries a drum 10' which has a peripheral face approximately tangent to the panel 9' but not adjacent that portion of the panel at which it is desired to locate the aperture 12'. As the shaft 5' is substantially parallel to the plane of the aperture, a celluloid belt or ribbon scale 11' may be arranged over the cylindrical drum surface and guided under the aperture by an idler drum 22. The indicating belt may be supported ot the rear of the panel aperture by a rigid surface 23 carried by the panel 9', which surface may be provided by a flat strip, as shown, or by an idler drum. An arrangement of this general form permits the use of an extended scale when the mechanical arrangement of the variable reactor shaft and the drum is such that it is not desired to locate the panel aperture in front of the drum.

Precision in tuning is especially desirable when a number of circuits are tuned concomitantly, and this precision as well as an extended scale for notations is provided by my invention.

While I have shown a worm drive for rotating the shaft and indicating drum, any means for supplying the necessary torsional force to the rotatable system falls within the spirit of my invention. The indicating drum is preferably a complete section of a right circular cylinder but the invention is not limited to this construction as a drum having the form of a truncated cone may be employed, or an incomplete section of a cylinder or cone may be used when the range of movement of the variable reactor is less than 360°. These and other changes in the several parts, their relative size, shape and location fall within the scope of my invention as set forth in the following claims.

I claim:—

1. A radio receiving apparatus comprising a variable reactive element, a shaft operative to vary said element, an indicating drum operated by said shaft, a translucent portion of the curved surface of said drum, a scale upon said translucent surface, and a source of illumination whereby said scale is illuminated from behind said translucent surface.

2. A radio receiving apparatus comprising a panel, a limited aperture in said panel, a variable reactive element behind said panel, a shaft operative to vary said reactive element, an indicating drum operated by said shaft, a translucent peripheral portion of said drum, a scale upon said translucent portion, and a source of illumination behind said translucent portion, said limited aperture having approximately the width of said scale and extending along the periphery of said drum for a distance small compared with the circumference thereof whereby only a restricted arc of the scale can be seen at one time.

3. A device of the character described comprising a panel, and control means adapted to operate a tuning device mounted on the rear side of the panel, said means including a drive shaft extending through the panel adapted to be manipulated from the front side thereof, a dial mounted at the rear of the panel and adapted to move with said device, and a light for the dial mounted at the rear of the panel, said panel having a window for observing the dial from the front of the panel.

4. A device of the character described comprising a panel and a control means adapted to operate a tuning device mounted on the rear side of the panel, said means including a reducing gear drive having a shaft extending through the panel adapted to be manipulated from the front side thereof, a dial adapted to be moved with said device, and a light for the dial, said panel having a window for observing the dial from the front of the panel.

5. A device for adjusting and for indicating the position of adjustment of a radio tuning element, comprising a housing, a shaft rotatably supported by said housing and operatively connected with the radio tuning element, a dial supported by said housing and having at least a portion thereof accessible from the exterior of the housing, scale markings upon said dial, means connecting said dial and shaft to ensure simultaneous angular movement thereof, operating means extending to the exterior of said housing for effecting angular adjustment of said shaft, stationary indicia means secured to said housing and cooperating with the scale markings on said dial, whereby the shaft and thereby the radio tuning element may be set to a desired adjustment by manipulation of said operating means to bring a predetermined scale marking into alinement with said indicia means, and an inscribable surface on said dial, whereby inscriptions may be placed on the accessible portion of said dial and adjacent said indicia means so that the angular positions of said dial and said radio tuning element may be determined from either the scale markings or by inscriptions.

6. A device for indicating the position of a radio tuning device comprising a dial pivotally mounted on a substantially horizontally extending axis and having a cylindrical peripheral surface, means for positioning said dial behind an instrument panel, said panel having a window whereby a relatively small arc of said periphery may be viewed, scale markings extending circumferentially about said periphery and visible thru said window, means for controlling the movement of said dial exteriorly of said panel, stationary indicia means secured to said panel and cooperating with said scale markings whereby the dial may be set to a predetermined angular position, and an inscribable surface on said cylindrical periphery whereby inscriptions may be placed on said dial adjacent said indicia means so that the position of the dial may be determined from either the scale markings or by inscriptions.

7. A dial installation for radio sets comprising a control mechanism adapted to operate a rotor part of an instrument of the set, a dial rotatable with said control to indicate the degree of rotation of the instrument to which the control mechanism is attached, means covering the control means and having a window for observing the dial therethrough, light means mounted behind the covering means for illuminating the dial so that it may be readily observed through the said window and a handle or knob exposed at the front of the covering means and connected to the control means for operation thereof.

8. A device of the character described comprising front wall means, and control means adapted to operate a tuning device on the rear side of the front wall means, said control means including a drive shaft extending through said front wall means and adapted to be manipulated from the front side thereof, a dial mounted at the rear of the front wall means and adapted to move with said tuning device, said front wall means having a window for observing the dial from the front of said front wall means, scale markings on said dial and observable through said window, stationary indicia means cooperating with said scale markings, and an inscribable surface on said dial whereby inscriptions may be placed on said dial so that the position of said dial and associated tuning device may be determined from either the scale markings or the inscriptions.

9. A device of the character described comprising front wall means, and control means adapted to operate a tuning device mounted on the rear side of the front wall means, said control means including a drive shaft extending through the front wall means adapted to be manipulated from the front side thereof, a dial mounted at the rear of the front wall means and adapted to move with said device, and a light for the dial mounted at the rear of the front wall means, said front wall means having a window for observing the dial from the front of the front wall means.

10. In radio apparatus, an instrument shaft, a dial thereon having a translucent edge, a panel in front of said dial, an opening in the panel, graduations on said translucent edge, adapted to pass in front of said opening, and means back of said dial for illuminating the translucent edge back of said opening.

11. In a device of the class described, the combination with a panel, of tuning means mounted to the rear of said panel, an indicator element, means for coupling said tuning means and said indicator element, means for actuating said coupling means, and control means on said front panel for operating said last named means whereby the tuning means and the indicator element are displaced, an aperture in said panel, adjacent which the indicator element is adapted to be position and be displaced, said indicator element comprising a translucent strip having indicia thereon, and an electric light adjacent said aperture for illuminating indicia on the portion of the indicator element passing said aperture.

12. In a device of the class described, the combination with a panel having an aperture thereon, of a drum carrying translucent indicating means to the rear of said panel, and having a peripheral portion thereof visible through said aperture, tuning means to the rear of said panel, a shaft for coupling said tuning means and said drum means operable from the front of said panel for rotating said shaft whereby to cause movement of said drum and turning means, an electric light disposed within the periphery of said drum whereby the displacement of said tuning means and said drum is illustrated by the reading on the illuminated portion of the indicating means to the rear of said aperture.

13. A device of the character described comprising front wall means and a control means adapted to operate a tuning device mounted on the rear side of the front wall means, said control means including a reducing gear drive having a shaft extending through the front wall means adapted to be manipulated from the front side thereof, a dial adapted to be moved with said device, and a light for the dial, said front wall means having a window for observing the dial from the front of the front wall means.

14. In apparatus for adjusting and for indicating the position of adjustment of a radio-tuning element, the combination with an opaque front wall means having a sight aperture therein, a shaft rotatably mounted at the rear of said front wall means and operatively connected with the radio tuning element, a graduated dial located at the rear of said front wall means and having a portion of the graduated section thereof visible through said sight aperture, and a light illuminating that portion of said dial which is visible through said aperture, of control for operating said shaft and dial, said control means comprising a shaft extending through said front wall means and operable from the front side thereof, a reducing gear drive between said control shaft and said first shaft, and means connecting said first shaft and said dial for insuring simultaneous angular adjustment thereof.

In testimony whereof, I affix my signature.

HAROLD A. SNOW.